US012792440B2

(12) United States Patent
Nazm Bojnordi

(10) Patent No.: US 12,792,440 B2
(45) Date of Patent: Nov. 10, 2026

(54) TECHNIQUES FOR STOCHASTIC SEQUENCE COMPACTION FOR ARTIFICIAL INTELLIGENCE ENGINES

(71) Applicant: QUALCOMM Incorporated, San Diego, CA (US)

(72) Inventor: Mahdi Nazm Bojnordi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 19/044,452

(22) Filed: Feb. 3, 2025

(65) Prior Publication Data

US 2026/0228074 A1 Aug. 6, 2026

(51) Int. Cl.
*G06F 11/07* (2006.01)

(52) U.S. Cl.
CPC ........ *G06F 11/076* (2013.01); *G06F 11/0721* (2013.01)

(58) Field of Classification Search
CPC .... G06F 11/076; G06F 11/0721; G06F 17/14; G06N 3/08
See application file for complete search history.

(56) References Cited

U.S. PATENT DOCUMENTS 4,128,829 A * 12/1978 Herbst ................. G06V 10/754 382/218
6,906,645 B2 * 6/2005 Jones ...................... G06T 9/005 341/51
7,167,857 B2 * 1/2007 Roberts ................... G06F 16/40
10,798,464 B1 * 10/2020 Joseph ............... H04N 21/6125
11,879,943 B1 * 1/2024 Goto .................. G01R 31/3278
2008/0050047 A1 * 2/2008 Bashyam ................ H03M 7/40 382/305
2013/0124474 A1 * 5/2013 Anderson ........... G06F 16/3338 707/634

(Continued)

FOREIGN PATENT DOCUMENTS

WO 2023241225 A1 12/2023

OTHER PUBLICATIONS

Dantas P.V., et al., "A Comprehensive Review of Model Compression Techniques in Machine Learning", Applied Intelligence., vol. 54, No. 22, Sep. 2, 2024, pp. 11804-11844, XP093385179, NL ISSN: 0924-669X, DOI: 10.1007/s10489-024-05747-w, The Whole Document.

(Continued)

*Primary Examiner* — Kamini B Patel
(74) *Attorney, Agent, or Firm* — Arent Fox Schiff LLP

(57) ABSTRACT

Aspects described herein relate to compacting segments of values for use by an artificial intelligence (AI) engine. Multiple approximate segments of values can be generated based at least on a code and a key. Each segment of values in a sequence of values can be compared to the multiple approximate segments of values to determine a candidate approximate segment to replace the segment of values. For each segment of values in the sequence of values, a signature corresponding to the candidate approximate segment determined for the segment of values can be stored in memory in place of the sequence of values, where the signature can indicate at least the code and the key of the candidate approximate segment.

18 Claims, 5 Drawing Sheets

(56) References Cited

U.S. PATENT DOCUMENTS

| | | | | |
|---|---|---|---|---|
| 2019/0095777 | A1 | 3/2019 | Kim et al. | |
| 2019/0332298 | A1* | 10/2019 | Madabhushi | G06F 3/0679 |
| 2020/0195273 | A1 | 6/2020 | Loh | |
| 2022/0027408 | A1* | 1/2022 | Serebrennikov | G06N 3/006 |
| 2022/0036184 | A1* | 2/2022 | Liu | G06N 20/00 |
| 2024/0395356 | A1* | 11/2024 | Jacob | G16B 15/20 |
| 2025/0095035 | A1* | 3/2025 | Kuan | G06F 40/40 |
| 2025/0337467 | A1* | 10/2025 | Kim | H04B 7/0626 |
| 2025/0378454 | A1* | 12/2025 | Kalia | G06Q 30/018 |
| 2026/0058708 | A1* | 2/2026 | Xiao | H04B 7/0482 |

OTHER PUBLICATIONS

International Search Report and Written Opinion—PCT/US2026/011250—ISA/EPO—Apr. 23, 2026.

* cited by examiner

200

| Segment | Bits |
| --- | --- |
| Segment 1 | 1000 0011 0100 1100 |
| Segment 2 | 1011 0101 1010 0110 |
| Segment 3 | 1110 1110 1101 1001 |
| Segment 4 | 0001 0010 0101 0100 |
| Segment 5 | 1000 0111 1110 1011 |
| Segment 6 | 0001 0010 1100 0111 |
| Segment 7 | 0011 0011 0110 1100 |
| Segment 8 | 1011 0101 1011 0101 |

202

214

| | Trial 1 | Trial 2 | . . . | | | Trial i | . . . | | Trial N |
| --- | --- | --- | --- | --- | --- | --- | --- | --- | --- |
| Code 204 | 0000 | 0000 | . . . | 1000 | 1001 | 1001 | . . . | 1001 | 1001 |
| Key 206 | 0000 | 0001 | . . . | 0001 | 0001 | 1000 | . . . | 1110 | 1111 |
| Approximate Segment 208 | 0000<br>0000<br>0000<br>0000 | 0001<br>1000<br>0100<br>0010 | . . . | 0001<br>0010<br>0100<br>1000 | 0001<br>0010<br>0100<br>1000 | 1000<br>0011<br>0110<br>1100 | . . . | 1110<br>1111<br>1101<br>1001 | 1111<br>1101<br>1001<br>0001 |
| Approximate error (relative absolute difference) 210 | 1<br>1<br>1<br>1 | 0.875<br>1.667<br>0<br>0.833 | . . . | 0.875<br>0.333<br>0<br>0.333 | 0.875<br>0.333<br>0<br>0.333 | 0<br>0<br>0.5<br>0 | . . . | 0.75<br>4<br>2.25<br>0.25 | 0.875<br>3.333<br>1.25<br>0.9167 |
| Aggregate error 212 | 4 | 3.375 | . . . | 1.5417 | 1.5417 | 0.5 | . . . | 7.25 | 6.375 |

FIG. 2

300

1000 0011 0100 1100 1011 0101 1010 0110 1110 1110 1101 1001 0001 0010 0101 0100

1000 0111 1110 1011 0001 0010 1100 0111 0011 0011 0110 1100 1011 0101 1011 0101

Segment 301

302

| | Trial 1 | Trial 2 | Trial 3 | Trial 4 | Trial 5 | Trial 6 | Trial 7 | Trial 8 | Trial 9 |
|---|---|---|---|---|---|---|---|---|---|
| Code 304 | 0000 | 0001 | 0010 | 0011 | 0100 | 0101 | 0110 | 0111 | 1000 |
| Key 306 | 0100 | 0100 | 0100 | 0100 | 0100 | 0100 | 0100 | 0100 | 0100 |
| Approximate Segments 308 | 0100 | 0100 | 0100 | 0100 | 0100 | 0100 | 0100 | 0100 | 0100<br>1000 |
| Error 310 | 0<br>0.75 | 0<br>0.75 | 0<br>0.75 | 0<br>0.75 | 0<br>0.75 | 0<br>0.75 | 0<br>0.75 | 0<br>0.75 | 0<br>0<br>0.8571 |
| Aggregate error 312 | 0 | 0 | 0 | 0 | 0 | 0 | 0 | 0 | 0 |

314

302

| | trial 10 | trial 11 | trial 12 | trial 13 | trial 14 | trial 15 | trial 16 |
|---|---|---|---|---|---|---|---|
| Code 304 | 1001 | 1010 | 1011 | 1100 | 1101 | 1110 | 1111 |
| Key 306 | 0100 | 0100 | 0100 | 0100 | 0100 | 0100 | 0100 |
| Approximate Segments 308 | 0100<br>1000 | 0100<br>1000<br>0101<br>1010 | 0100<br>1000<br>0111<br>1110<br>1011<br>0001<br>0010 | 0100<br>1000<br>1001<br>1011<br>1111 | 0100<br>1000 | 0100<br>1000 | 0100<br>1000 |
| Error 310 | 0<br>0<br>0.5714 | 0<br>0<br>0.2857<br>0.2857<br>0.9091 | 0<br>0<br>0<br>0<br>0<br>0<br>0<br>0.6667 | 0<br>0<br>0.2875<br>0.2143<br>0.3634<br>6 | 0<br>0<br>0.5741 | 0<br>0<br>0.8571 | 0<br>0<br>1.1429 |
| Aggregate error 312 | 0 | 0.5714 | 0 | 0.8636 | 0 | 0 | 0 |

FIG. 3

TECHNIQUES FOR STOCHASTIC SEQUENCE COMPACTION FOR ARTIFICIAL INTELLIGENCE ENGINES

FIELD OF THE DISCLOSURE

Aspects of the present disclosure relate generally to artificial intelligence (AI) engines, and more particularly, to storing data for processing by AI engines.

DESCRIPTION OF RELATED ART

Large artificial intelligence (AI) models use matrix-vector and matrix-matrix multiplications implemented with multiply-and-accumulate (MAC) operations as computations for AI inference. These computations use operands, including weights (w) and activations (a), that are loaded from memory to compute an output (y), e.g., y=

$$\sum_{i=0}^{n-1} a_i w_i.$$

Ine total data consumed by each MAC unit can be determined by the sequence length and data bit-width: size=n (a_width+w_width). Large sequences can require substantial computational power and memory resources to perform the computations. Approximation techniques, such as weight and activation quantitation, have been employed to decrease memory capacity and bandwidth for AI workloads. The goal of quantization is to reduce the bit-width, thereby decreasing the size of weights and activations. Reducing the bit-width (e.g., quantizing to 8 bits or fewer), however, can lead to significant accuracy loss. In addition, quantization techniques can be constrained by value ranges that define the limits of bit widths. Compression techniques have also been used, but only work best on low entropy data with high similarity among elements. In addition, achieving high compression ratios often involve complex algorithms that add significant runtime overhead.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for compacting segments of values for use by an artificial intelligence (AI) engine is provided that includes one or more processors, one or more memories coupled with the one or more processors, and instructions stored in the one or more memories. The instructions are operable, when executed by the one or more processors, to cause the apparatus to generate, based at least on a code and a key, multiple approximate segments of values, compare each segment of values in a sequence of values to the multiple approximate segments of values to determine a candidate approximate segment to replace the segment of values, and store, in the one or more memories and for each segment of values in the sequence of values, a signature corresponding to the candidate approximate segment determined for the segment of values, wherein the signature indicates at least the code and the key of the candidate approximate segment.

In another aspect, a computer-implemented method for compacting segments of values for use by an artificial intelligence (AI) engine is provided that includes generating, based at least on a code and a key, multiple approximate segments of values, comparing each segment of values in a sequence of values to the multiple approximate segments of values to determine a candidate approximate segment to replace the segment of values, and storing, in a memory and for each segment of values in the sequence of values, a signature corresponding to the candidate approximate segment determined for the segment of values, wherein the signature indicates at least the code and the key of the candidate approximate segment.

In another aspect, a computer-readable medium is provided that includes code executable by one or more processors for compacting segments of values for use by an AI engine. The code includes code for generating, based at least on a code and a key, multiple approximate segments of values, comparing each segment of values in a sequence of values to the multiple approximate segments of values to determine a candidate approximate segment to replace the segment of values, and storing, in a memory and for each segment of values in the sequence of values, a signature corresponding to the candidate approximate segment determined for the segment of values, wherein the signature indicates at least the code and the key of the candidate approximate segment.

In a further aspect, an apparatus is provided that includes a transceiver, a memory configured to store instructions, and one or more processors communicatively coupled with the transceiver and the memory. The one or more processors are configured to execute the instructions to perform the operations of methods described herein. In another aspect, an apparatus is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2 illustrates an example of an operand represented as a sequence of values and a list of trials for performing fixed segmentation of the sequence of values, in accordance with aspects described herein;

FIG. 3 illustrates an example of an operand represented as a sequence of values and a list of trials for performing variable segmentation of the sequence of values, in accordance with aspects described herein;

DETAILED DESCRIPTION

Figure 1:
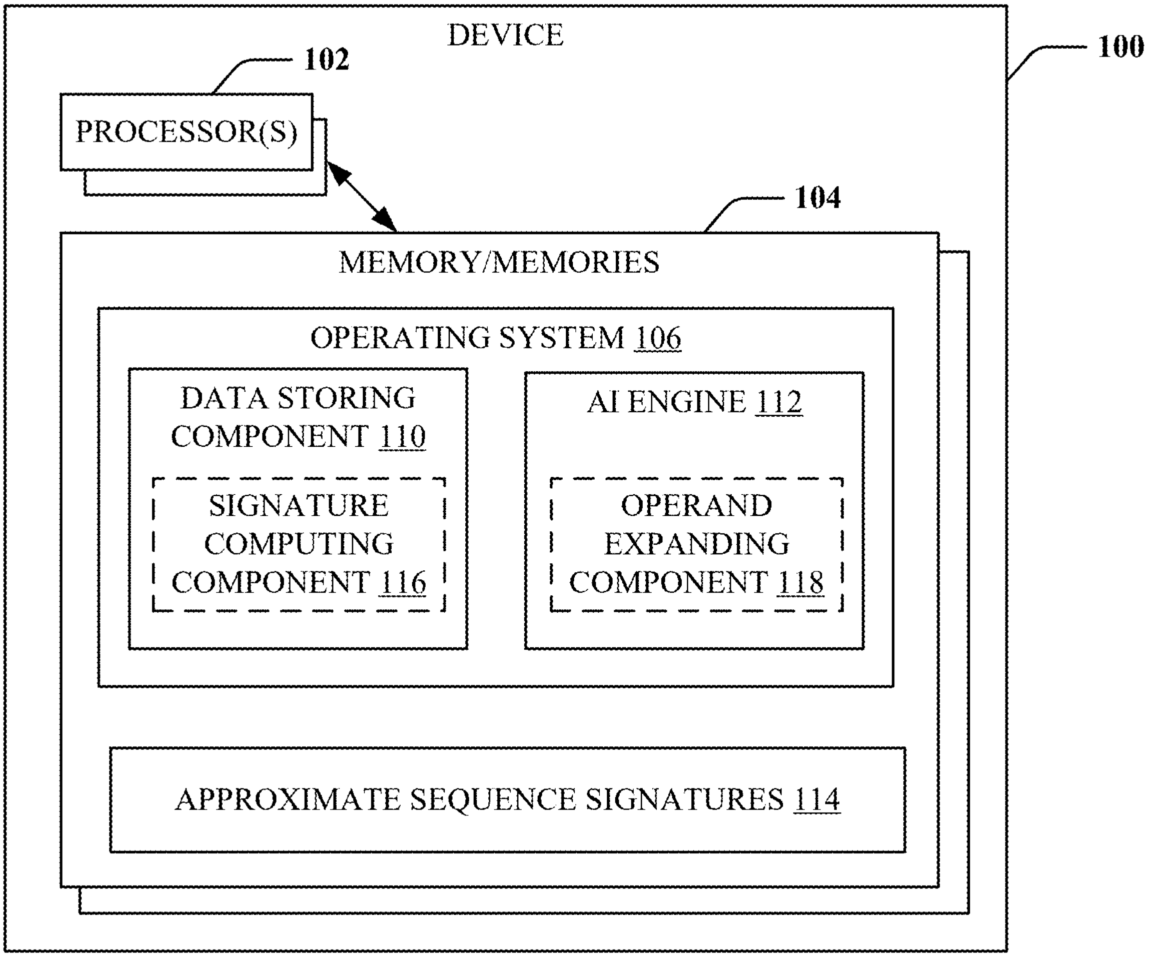
FIG. 1 is a system level block diagram of an example of a device for performing functions related to sequence compaction for artificial intelligence (AI) engines, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to sequence compaction to partition long sequences of values into smaller segments for storing and using in artificial intelligence (AI) model inference computations. For example, the long sequences in operands used for inference operations, including weights (w) and/or activations (a), can be compacted into smaller segments, which can be stored instead of the original operand data. The smaller segments can be computed offline as a separate process or online as the data is being utilized in the inference computation. Operand expansion can be performed for the smaller segments to yield the long sequences (or sequences similar to the long sequences) of the operand when performing the inference computations (e.g., the associated matrix/vector operations). Storing in memory, and transferring from memory storage, smaller amounts of data can improve performance of AI inference computation by decreasing memory storage requirements and lowering bandwidth needed to transfer data for computation or other processing.

In one example, an actual segment of operand data can be replaced by a signature of one of multiple approximate segments, also referred to herein as a candidate approximate segment, where the signature can be of a smaller size than the original actual segment. For example, the signature can indicate a code and/or key associated with the candidate approximate segment to allow for subsequent retrieval or computation of the candidate approximate segment associated with the signature. In one example, a fixed segmentation can be performed where segments are generated to be of a fixed segment size based on determining which one of the multiple approximate fixed size segments is most similar to the actual segment in the data that is of the same size. In another example, a variable segmentation can be performed where the length of the candidate approximate segment used to represent the actual segment of data can be determined or selected as the longest segment have a least aggregate error (or an aggregate error less than a threshold), where the aggregate error can be computed as the error between the values of the candidate approximate segment and the actual segment of data. In this example, the signature may also indicate the length of the selected candidate approximate segment. In any case, the signature can be used to represent the actual segment, which can save storage size for the data. For example, this can be performed multiple times to encode each segment in the data. When the data is fetched for inference computation, the AI engine can perform operand expansion based on the code and key, and/or length, to obtain the candidate approximate segment for generating the original operand data (or a close approximation of the original operand data).

For example, aspects described herein can be integrated into various machine learning (ML) accelerators, spanning from edge devices to data centers, to minimize memory usage and bandwidth needs for large ML models, generative AI processes, etc. One example of an application is in large language models (LLMs), which often struggle with the substantial size of weights and activations required for matrix and vector computations. Aspects described herein can be utilized to reduce the size of weights and activations stored for the matrix and vector computations, which can reduce storage requirements, bandwidth needed to move the weights and activations for use in computation, and/or the like.

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a system level block diagram of an example of a device 100 (e.g., a computing device) for performing functions related to sequence compaction for artificial intelligence (AI) engines, in accordance with aspects described herein. In an example, device 100 can include one or more processors 102 and/or memory/memories 104 configured to execute or store instructions or other parameters related to providing an operating system 106, which can execute one or more applications or processes. For example, processor(s) 102 and memory/memories 104 may be separate components communicatively coupled by a bus (e.g., on a motherboard or other portion of a computing device, on an integrated circuit, such as a system on a chip (SoC), etc.), components integrated within one another (e.g., processor(s) 102 can include the memory/memories 104 as an on-board component), and/or the like. Memory/memories 104 may store instructions, parameters, data structures, etc. for use/execution by processor(s) 102 to perform functions described herein. In another example, processor(s) 102 and/or memory/memories 104 can be distributed over multiple devices or physical computing nodes in a network (e.g., in a cloud-based computing platform) for providing the functions of the various components described herein.

In one example, the operating system 106 can execute one or more applications or processes, which may include a data storing component 110 for storing approximate sequence signatures 114 representative of operands for AI computations, and/or an AI engine 112 for performing operand expansion on the approximate sequence signatures 114 to obtain an expanded sequence representing an operand for performing an AI inference or associated computation, such as a matrix-vector or matrix-matrix multiplication, etc. For example, data storing component 110 can include a signature computing component 116 for computing a signature for a segment of values, where the signature can be of a size less than the segment of values, for storing as an approximate sequence signature 114. For example, AI engine 112 can include an operand expanding component 118 for expanding a sequence of values of operand data from an approximate sequence signature 114 for use in performing the AI inference computation or other operation. In one example, though not shown in FIG. 1, AI engine 112 can also include a signature computing component 116 for computing approximate sequence signatures 114 for storing for different layers or accumulations during the AI inference computation.

For example, signature computing component 116, whether used by a data storing component 110 or AI engine 112, can perform sequence compaction to compact sequences of values to smaller sized signatures. Signature computing component 116 can compact sequences offline of the AI engine 112 computations or online during the AI engine 112 computations. For example, signature computing component 116 can compact sequences of values representing model weights as the values are received offline, which can convert longer weight sequences to smaller signatures. In another example, signature computing component 116 can compact sequences of values representing activations as the values are computed or used in layers of the AI engine 112 computations online, which can compute smaller sequences for online activation encoding to reduce runtime overhead. In either case, for example, storage of the compacted sequences as approximate sequence signatures 114 can require less storage resources in memory/memories 104 than storing the sequence of values. In addition, moving the signatures from memory/memories 104 to processor(s) 102 can require less bandwidth than moving the corresponding sequence of values.

In any case, for example, when the signatures for the operands (e.g., the weights or activations) are retrieved, operand expanding component 118 can expand the signatures into the corresponding approximate sequences for use in performing the AI inference computations (e.g., matrix-vector or matrix-matrix multiplication operations). The operand expansion, in accordance with aspects described herein, can be a lightweight hardware unit used at compute engines (e.g., at AI engine 112). In this regard, for example, a sequence of values(S), which can be weights or activations used by an AI engine 112 can be compacted where each value $v(=v_{\beta-1} \ldots v_0)$ in the sequence S can be an integer or a floating-point number, represented with β bits. Substantially any input sequence can be divided into smaller segments in this regard using one or more types of segmentation. Signature computing component 116 can use one or multiple segmentation types to divide sequences into smaller segments, e.g., where different types of segmentation can be used to balance compaction ratio and complexity. One segmentation type can be a fixed segmentation where fixed size segments of the sequence can be compacted into smaller signatures. Fixed segmentation can use simpler algorithms for sequence compaction. Another segmentation type can include variable segmentation where variable size segments of the sequence can be compacted into smaller signatures. Variable segmentation can achieve a better compaction ratio with more advanced algorithms.

FIG. 2 illustrates an example of an operand represented as a sequence of values 200 and a list of trials 202 for performing fixed segmentation of the sequence of values, in accordance with aspects described herein. In FIG. 2, a 32 byte sequence of values 200 is shown. Using fixed segmentation, in an example, signature computing component 116 can segment the sequence of values 200 into multiple segments, such as 8 different 4-byte segments, as shown. The fixed size of the segments, and/or the number of segments, for a given sequence of values can be selected to balance resource savings with accuracy of the approximate segments generated by the signature computing component 116. Signature computing component 116 can compute, or be configured with, a set of possible trials (e.g., sequences of approximate values) for each segment, which can be based on a code (c) and/or a key (k). For example, signature computing component 116 can compute the trials based on logic or code similar to the following, where Q represents the set of approximate segments generated for the code (c) and/or a key (k):

```
1:  Ω ← { }
2:  for next possible signature (c, k)
    1:  T ← { }, τ ←k
    2:  repeat α times
        1:  T ← T ∪ { τ }
        2:  if c_(β−1)=1 then
            1:  if τ_(β−1)=1 then
                1:  τ←[c_(β−2)...c_0 0]⊕[τ_(β−2)...τ_0 τ_(β−1)]
            2:  else
                1:  τ ←[τ_(β−2)...τ_0 τ_(β−1)]
        3:  else
            1:  if τ_0=1 then
                1:  τ ←[0c_(β−2)...c_0]⊕[τ_0 τ_(β−1)...τ_1]
            2:  else
                1:  τ ← [τ_0 τ_(β−1)...τ_1]
    3:  Ω ← Ω ∪ { T }
```

An example of a list of trials 202 is shown in FIG. 2. The list of trials 202 can include trials 1 to N, each of which is identified by a respective code 204 and key 206 used to generate the trial (e.g., based on the above logic or code), each having a respective approximate segment computed using the code 204 and key 206.

For each segment in the sequence of values 200, signature computing component 116 can compare the segment to the approximate segment 208 of each trial in the list of trials 202 to determine which trial is most similar to the segment. For example, in comparing the segment from the sequence of values 200 to the approximate segment, signature computing component 116 can determine an approximate error (relative absolute difference) 210 between each value in the segment and a corresponding value in the approximate segment 208. In this example, signature computing component 116 can then compute the aggregate error 212 for the segment (e.g., the total of the approximate errors 210 for each value in the segment), and select the trial with the lowest aggregate error 212.

In the example shown in FIG. 2, signature computing component 116 can select trial i 214 as a candidate approximate segment to represent Segment 1 in the sequence of values 200 as having the lowest aggregate error 212 among the trials for Segment 1. Signature computing component 116 can accordingly replace Segment 1 in the sequence of values 200 with a signature of the candidate approximate segment that includes, or is otherwise based on, the code 204 and key 206 of the candidate approximate segment (e.g., of trial i) for storing in memory/memories 104. As the code 204 and key 206 have a lesser number of values in Segment 1, storage resource savings can be achieved, as can bandwidth savings for transferring the signature from the memory/memories 104 to one or more processors 102 for AI engine 112 to perform AI inferences or other computations. There may, however, be an associated approximation error between the approximate segment 208 and the original segment when the approximate segment 208 is later expanded from the stored signature, but the resource savings by using approximate segments may outweigh detriment of the approximation error.

FIG. 3 illustrates an example of an operand represented as a sequence of values 300 and a list of trials 302 for performing variable segmentation of the sequence of values, in accordance with aspects described herein. In FIG. 3, a 32 byte sequence of values 300 is shown, which can be similar to the sequence of values 200 in FIG. 2. Using variable segmentation, in an example, signature computing component 116 can segment the sequence of values 300 into one or more segments having varying size. The varying size of the segments for a given sequence of values can be selected as a largest segment of the sequence of values 300 having an approximate segment that is within a threshold error tolerance. In this regard, for example, signature computing component 116 can determine the length of each segment by, or based on, the approximation error. A segment can end when the approximation error exceeds a threshold (o), which may be user-defined. In this example, a signature corresponding to a selected approximate segment can include, in addition to code (c) and/or a key (k), a length (l) parameter to define the length of each segment. For example, starting at position i in the input sequence S, signature computing component 116 can use a first procedure to generate a set of variable-length approximate segments, and another procedure to select the longest segment with the least aggregate error from the approximate segments, as described herein. In any case, as described above, signature computing component 116 can replace the variable-length segment in the sequence of values 300 with the signature of the selected approximate segment.

For example, signature computing component 116 can compute the trials in the list of trials 302 1-16 based on logic or code similar to the following, which may include using the first value in the segment as the key (k) 306 (and thus, the number of trials can correspond to the length of the code 304):

```
1:  Ω ←{ }, i←position of next value in sequence S
2:  k←S_i
3:  for next possible code c
      1:  τ←k, T ←{ }, l←0, ε←0
      2:  while ε<σ and l<max_length
            1:  T ← T ∪ τ
            2:  l←l+1
            3:  τ←approximate(c,τ)
            4:  ε←(|S_(i+l)−τ|)/(|S_(i+l) |)
      3:  Ω ← Ω +{ T }
```

In an example, signature computing component 116 can select the trial and/or size of the segment based on logic or code similar to the following:

```
1:  T _out←{ }, ε_out←0, l_out←0
2:  for next T in Ω
      1:  if l_out←length(T) then
            1:  T _out← T
            2:  ε_out←aggregate_error( T )
            3:  l_out←length(T)
      2:  else if l_out=length(T) then
            1:  if ε_out>aggregate_error(T) then
                  1:  T _out← T
                  2:  ε_out←aggregate_error( T )
3:  form a signature using code, key, and length of T_out
```

In the example shown in FIG. 3, signature computing component 116 can select trial 12 314 for a Segment 301 in the sequence of values 300 as having a largest number of approximate segments 308 that achieve an error less than a threshold among the trials in the list of trials 302 1-16. For example, signature computing component 116 can traverse each trial 1-16, comparing the values in the approximate segments 308 to the values in the sequence of values starting at the first value of Segment 301. When signature computing component 116 reaches a value in the approximate segments 308 for a trial that exceeds the error threshold (e.g., σ=0.5 in this example), signature computing component 116 can compute the aggregate error 312 of the values in the approximate segments 308 evaluated up to that point for the trial, and move to the next trial for comparison. After considering all trials in the list of trials 302 1-16, signature computing component 116 can determine which of the trials resulted in the largest number of values in the approximate segments 308 before encountering a value that exceeded the error threshold. Signature computing component 116 can select that trial as the candidate approximate segment whose signature is used to replace the number of values in the sequence of values 300. In an example, if two or more trials resulted in the same largest number of values, signature computing component 116 can select the trial from the two or more trials having the lowest aggregate error 312 as the candidate approximate segment. In any case, signature computing component 116 can replace the segment of values in the sequence of values 300 (e.g., segment 301 in the example in FIG. 3) with the signature of the selected candidate aggregate segment, where the signature can include the code 204, key 206, and length (e.g., number of approximate segments 308) of the trial.

For example, for segment 301 starting with value 0100 (e.g., where the previous values in the sequence of values 300 have been compacted into one or more signatures), signature computing component 116 can set the key 306 equal to the first value of the segment 301, 0100, and for each trial, the code 304 can be one of the values from 0000 to 1111. Signature computing component 116 can proceed to generate the approximate segment 308 values for each trial, or can generate the approximate segment 308 values for each trial until the threshold error is observed, and then move to the next trial. In an example, signature computing component 116 can use the logic or code above to generate the approximate segments 308 for each trial and/or to select one of the trials as the candidate approximate segment for generating the signature for storage. As shown, for the first 8 trials, signature computing component 116 can determine that the first value in the approximate segment 308, 0100, has 0 error 310, as it matches the first value of the segment 301, but the next value in the approximate segment has over a threshold error (e.g., 0.75>0.5). Thus, signature computing component 116 can generate the single value in the approximate segment 308 and move to the next trial. In trial 9, signature computing component 116 can determine that the first two values of the approximate segment 308 have less than the threshold error (e.g., 0 error as they match the first two values of segment 301), and then that the third value has over the threshold error (e.g., 0.871>0.5). Thus, signature computing component 116 can generate the first two values in the approximate segment 308 and move to the next trial, and so on. After considering the 16 trials, signature computing component 116 can select trial 12 as the candidate approximate segment, as it generated the most (seven) values under the threshold error. Signature computing component 116 can accordingly replace the segment 301 in the sequence of values 300 with the signature for the candidate approximate segment in trial 12, which can include the code 304, key 306 of trial 12, and the length of 7.

Figure 4:
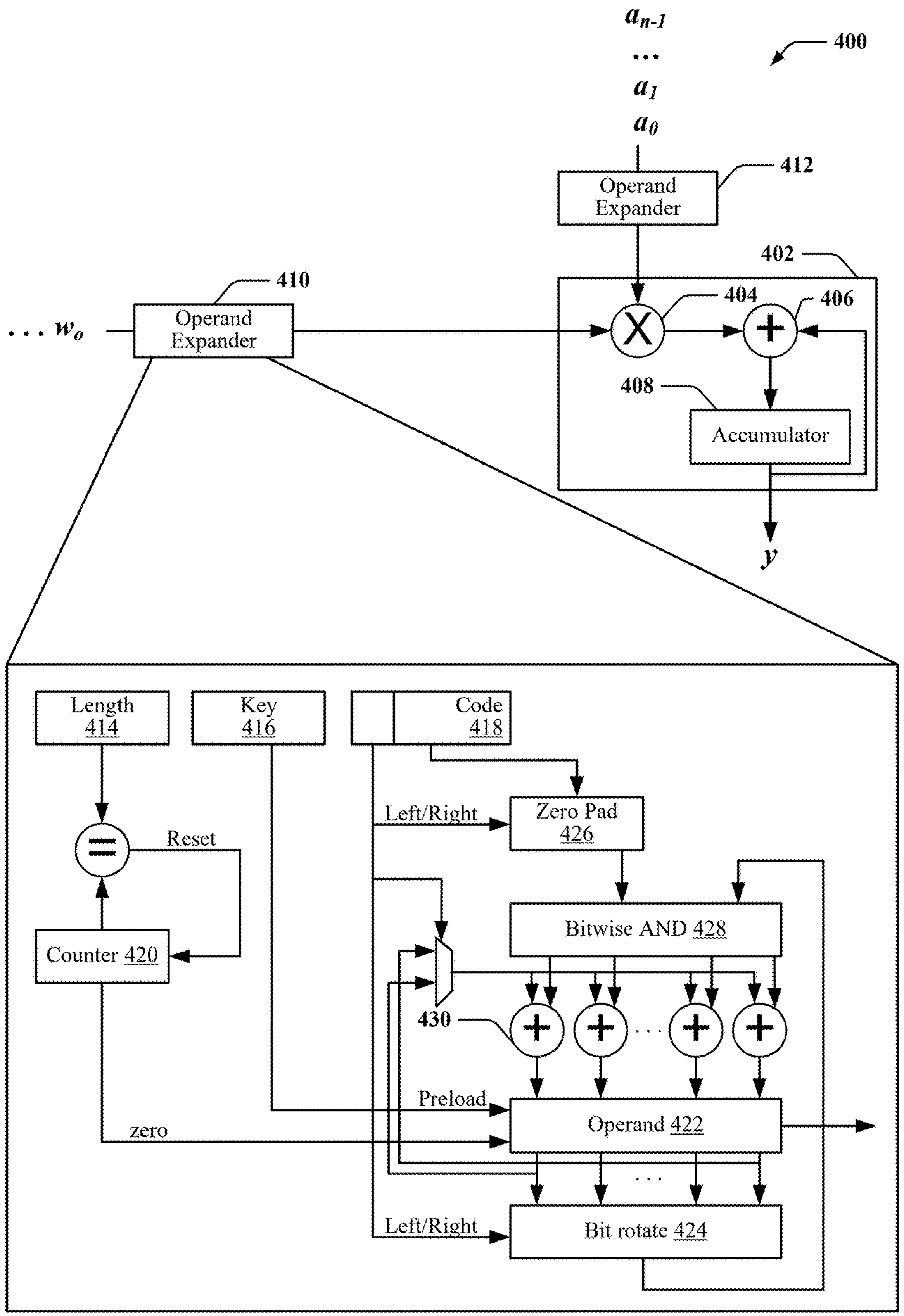
FIG. 4 is a schematic diagram of an example of a configuration of components for performing AI inference computations using compacted sequences, in accordance with aspects described herein.

FIG. 4 is a schematic diagram of an example of a configuration 400 of components for performing AI inference computations using compacted sequences, in accordance with aspects described herein. For example, the configuration 400 of components can include an AI engine 402, which may be similar to AI engine 112, for performing multiply 404 and accumulate 406 (MAC) operations on operand data, such as weights (w) and/or activations (a), as described above. AI engine 402 can include an accumulator 408 for accumulating and generating an output y. As the AI engine 402 can receive and operate on compacted sequences, as described herein, the AI engine 402 can include, or can be communicatively coupled with, one or more operand expanders 410 and 412 to expand compacted sequences (e.g., as described of operand expanding component 118). In one example, operand expander 410 can include hardware elements to perform operand expansion based on a signature, where the signature can include length 414, key 416, and code 418, which may be similar to the length key 206 or 306 and code 204 or 304 described above. For fixed segmentation, for example, the length can be fixed as the size of each segment, or for variable segmentation, the length can be specified in the signature stored for the segment.

For example, operand expander 410 can initialize the length 414, key 416, and code 418 at the start of each segment. For a given sequence of values, operand expander 410 can retrieve the signatures from memory (e.g., memory/ memories 104). Operand expander 410 can maintain an internal counter 420 to track the number of operands generated for each segment. When the counter equals the length 414, the operand expander 410 components can complete operand expansion for the signature and reset and process a next signature. During operand expansion, if the counter 420 is zero, the key 416 can be preloaded to the operand 422 and fed to MAC unit via multiplier 404. Every cycle, the counter 420 is incremented, and operands 422 are locally generated and fed to MAC unit via multiplier 404. A bit rotate 424 (e.g., bitwise rotation) can be performed on the operand 422 to left or right by one bit, and is determined using most significant bit of the operand 422. The same bit can be used to determine whether to apply a zero pad 426 to the rotated operand. Subsequently, a bitwise AND 428 can be performed with the rotated operand, and then XOR operations (e.g., XOR 430) on the least significant bit or most significant bit of the rotated operand to create the new operand 422. This process can continue until the counter reaches the length 414 of the compacted sequence, and the operand 422 can be output to the AI engine 402 for MAC operations.

Figure 5:
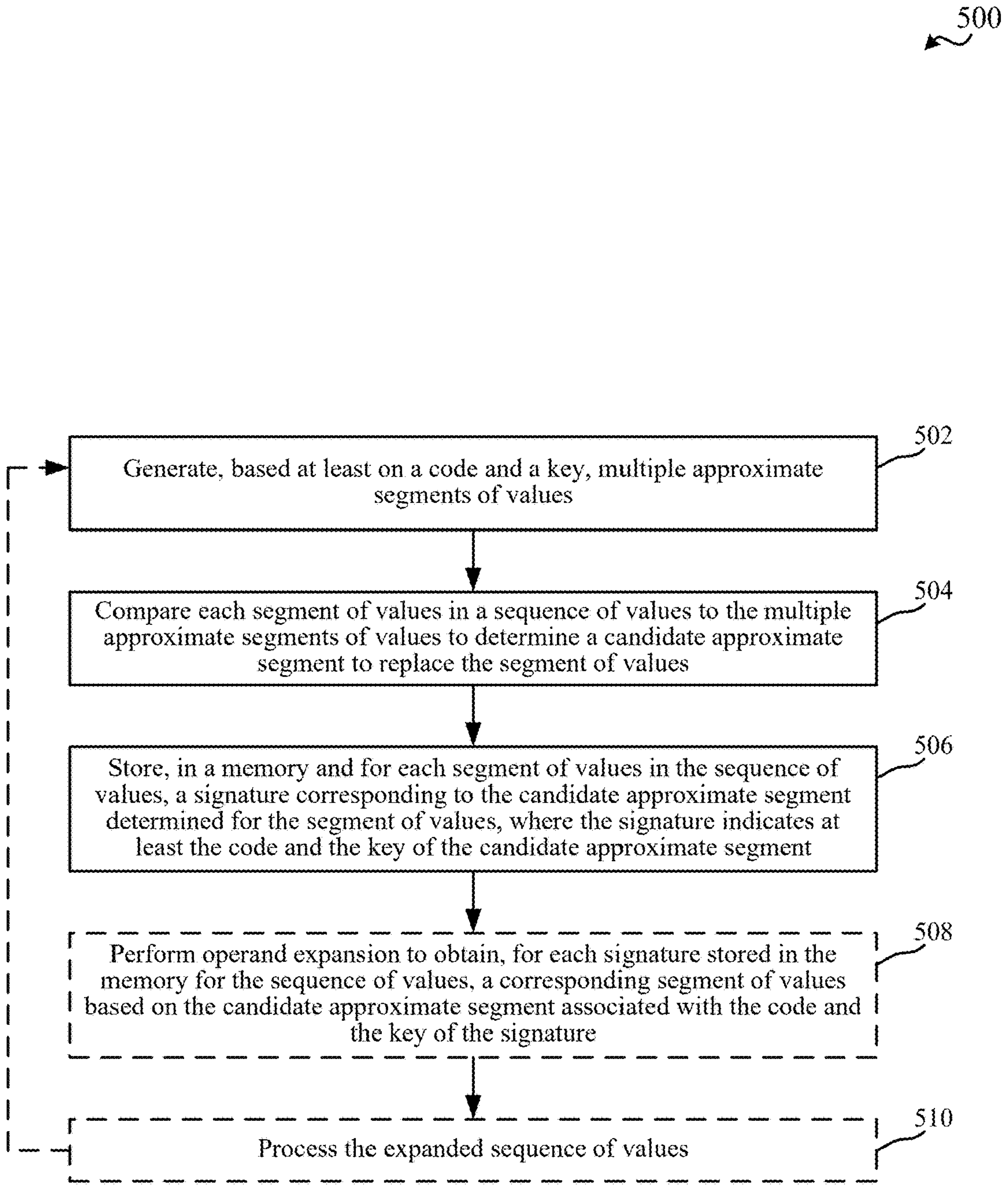
FIG. 5 illustrates a flow chart of an example of a method for compacting a sequence of values into approximate segments, in accordance with aspects described herein.

FIG. 5 illustrates a flow chart of an example of a method 500 for compacting a sequence of values into approximate segments, in accordance with aspects described herein. In an example, a device 100 can perform the functions described in method 500 shown in FIG. 5 using one or more of the components described in FIG. 1.

In method 500, at Block 502, multiple approximate segments of values can be generated based at least on a code and a key. In an aspect, signature computing component 116, e.g., in conjunction with processor(s) 102, memory/memories 104, operating system 106, data storing component 110, AI engine 112, etc., can generate, based at least on the code and the key, the multiple approximate segments of values. For example, signature computing component 116 can compute each of the multiple approximate segments according to a fixed size segmentation, where each approximate segment is of the same size (e.g., using the logic or code described in reference to FIG. 2 above). In another example, signature computing component 116 can compute each of the multiple approximate segments according to a variable size segmentation, which can be based on a key set as a first value in the sequence to be compacted (e.g., using the logic or code described in reference to FIG. 3 above). For example, signature computing component 116 can generate multiple trials, each associated with a code and key and including one or more approximate segment values for comparing to values in the sequence of values to be replaced by an approximate segment. In one example, the trials can be specific to at least a portion of the sequence of values being considered for replacement by an approximate segment. In addition, for example, the sequence of values can correspond to an operand used in AI inference computations or other operations, such as a weight (w) operand, an activation (a) operand, etc.

In method 500, at Block 504, each segment of values in a sequence of values can be compared to the multiple approximate segments of values to determine a candidate approximate segment to replace the segment of values. In an aspect, signature computing component 116, e.g., in conjunction with processor(s) 102, memory/memories 104, operating system 106, data storing component 110, AI engine 112, etc., can generate, based at least on the code and the key, the multiple approximate segments of values. For example, signature computing component 116 can compare each segment of values in a sequence of values to the multiple approximate segments of values to determine a candidate approximate segment to replace the segment of values. As described, for fixed segmentation, signature computing component 116 can compare a fixed-size segment of values from the sequence of values to each approximate segment of each trial to determine which is closest to the fixed-size segment from the sequence of values, and can determine the associated approximate segment as the candidate approximate segment to replace the actual segment in the sequence of values. For variable segmentation, signature computing component 116 can generate the trials using a key set to the first value of the sequence of values, and can, for each trial, evaluate each value generated in the approximate segment until a value that exceeds a threshold error from the corresponding value in the sequence of values is encountered, and then can move to the next trial. In this example, signature computing component 116 can select the candidate approximate segment from the trial with the largest number of approximate segment values that are within the error threshold (and/or having a lowest aggregate error where two or more trials have the same largest number of approximate segment values).

In method 500, at Block 506, a signature corresponding to the candidate approximate segment determined for the segment of values can be stored, in memory and for each segment of values in the sequence of values, where the signature indicates at least the code and the key of the candidate approximate segment. In an aspect, signature computing component 116, e.g., in conjunction with processor(s) 102, memory/memories 104, operating system 106, data storing component 110, AI engine 112, etc., can store, in a memory (e.g., memory/memories 104) and for each segment of values in the sequence of values, the signature corresponding to the candidate approximate segment determined for the segment of values, where the signature indicates at least the code and the key of the candidate approximate segment (e.g., of the trial that generated the candidate approximate segment). For variable segmentation, the signature may also include the length of the approximate segment.

In method 500, optionally at Block 508, operand expansion can be performed to obtain, for each signature stored in the memory for the sequence of values, a corresponding segment of values based on the candidate approximate segment associated with the code and the key of the signature. In an aspect, operand expanding component 118, e.g., in conjunction with processor(s) 102, memory/memories 104, operating system 106, AI engine 112, etc., can perform operand expansion to obtain, for each signature stored in the memory (e.g., memory/memories 104) for the sequence of values, the corresponding segment of values based on the candidate approximate segment associated with the code and the key of the signature. For fixed segmentation, operand expanding component 118 can perform operand expansion further based on the fixed size length of the segments. For variable segmentation, each signature can also indicate the length of the segment represented by the signature, and operand expanding component 118 can perform the operand expansion based on the indicated length. In one example, operand expanding component 118 can perform operand expansion as described in reference to FIG. 4.

In method 500, optionally at Block 510, the expanded sequence of values, generated by performing the operand expansion, can be processed. In an aspect, AI engine 112, e.g., in conjunction with processor(s) 102, memory/memories 104, operating system 106, etc., can process the expanded sequence of values. For example, AI engine 112 can perform MAC operations or other AI inferences or computations using the expanded sequence of values. In one example, as described above, performing the operations or computations can result in generating additional sequences of values, which can also be stored using compacted sequences and/or recalled from storage using operand expansion. Thus, following or during processing the expanded sequence of values at Block 510, method may proceed to Block 502 (or another method 500 may begin) to store output sequence of values as compacted segments in one layer of processing and/or performing operand expansion by a next layer of processing for using the output sequence of values by the next layer.

The following aspects are illustrative only and aspects thereof may be combined with aspects of other embodiments or teaching described herein, without limitation.

Aspect 1 is a method for compacting segments of values for use by an AI engine including generating, based at least on a code and a key, multiple approximate segments of values, comparing each segment of values in a sequence of values to the multiple approximate segments of values to determine a candidate approximate segment to replace the segment of values, and storing, in a memory and for each segment of values in the sequence of values, a signature corresponding to the candidate approximate segment determined for the segment of values, where the signature indicates at least the code and the key of the candidate approximate segment.

In Aspect 2, the method of Aspect 1 includes segmenting the sequence of values into each segment of values using a fixed segmentation size, where generating the multiple approximate segments of values includes generating the multiple approximate segments of values to each be of the fixed segmentation size, and where determining the candidate approximate segment for a given segment of values in the sequence of values includes determining one of the multiple approximate segments that is most similar to the given segment.

In Aspect 3, the method of any of Aspects 1 or 2 includes performing operand expansion to obtain, for each signature stored in the memory for the sequence of values, a corresponding segment of values based on the candidate approximate segment associated with the code and the key of the signature.

In Aspect 4, the method of any of Aspects 1 to 3 includes segmenting the sequence of values into each segment of values using a variable segmentation size, where generating the multiple approximate segments of values includes generating the multiple approximate segments by setting a generation key as the key and generating each of the multiple approximate segments based on the generation key and a different code, where determining the candidate approximate segment for a given segment of values in the sequence of values includes determining one of the multiple approximate segments that, when compared to the given segment of values, yields an error less than a threshold for a largest number of values as compared to other ones of the multiple approximate segments, and where the signature includes a length corresponding to the number of sequential values.

In Aspect 5, the method of Aspect 4 includes where determining the candidate approximate segment for a given segment of values in the sequence of values further includes determining one of two or more multiple approximate segments that, when compared to the given segment of values, yield an error less than a threshold for a same number of values, having a lower aggregate error when compared to the given segment of values.

In Aspect 6, the method of any of Aspects 4 or 5 includes performing operand expansion to obtain, for each signature stored in the memory for the sequence of values, a corresponding segment of values based on the candidate approximate segment associated with the code and the key and the length of the signature.

In Aspect 7, the method of Aspect 6 includes where performing the operand expansion includes maintaining a counter of a number of values generated based on the code and the key, and adding the key to the sequence of values when the counter is an initial value and completing expansion of the sequence of values when the counter equals the length.

Aspect 8 is an apparatus including one or more processors, one or more memories coupled with the one or more processors, and instructions stored in the one or more memories and operable, when executed by the one or more processors, to cause the apparatus to perform any of the methods of Aspects 1 to 7.

Aspect 9 is an apparatus including means for performing any of the methods of Aspects 1 to 7.

Aspect 10 is one or more computer-readable media including code executable by one or more processors, the code including code for performing any of the methods of Aspects 1 to 7.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration. By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for compacting segments of values for use by an artificial intelligence (AI) engine, comprising:

one or more processors;

one or more memories coupled with the one or more processors; and instructions stored in the one or more memories and operable, when executed by the one or more processors, to cause the apparatus to:

generate, based at least on a code and a key, multiple approximate segments of values;

compare each segment of values in a sequence of values to the multiple approximate segments of values to determine a candidate approximate segment to replace the segment of values;

store, in the one or more memories and for each segment of values in the sequence of values, a signature corresponding to the candidate approximate segment determined for the segment of values, wherein the signature indicates at least the code and the key of the candidate approximate segment;

perform operand expansion to obtain, for each signature stored in the one or more memories for the sequence of values, a corresponding segment of values based on the candidate approximate segment associated with at least the code and the key indicated by the signature; and perform, by the AI engine, an AI inference computation on an operand including the corresponding segment of values obtained by the operand expansion.

2. The apparatus of claim 1, wherein the instructions, when executed by the one or more processors, cause the apparatus to:

segment the sequence of values into each segment of values using a fixed segmentation size, generate the multiple approximate segments of values to each be of the fixed segmentation size, and determine the candidate approximate segment for a given segment of values in the sequence of values including determining one of the multiple approximate segments that is most similar to the given segment.

3. The apparatus of claim 1, wherein the instructions, when executed by the one or more processors, cause the apparatus to:

segment the sequence of values into each segment of values using a variable segmentation size, generate the multiple approximate segments by setting a generation key as the key and generating each of the multiple approximate segments based on the generation key and a different code, determine the candidate approximate segment for a given segment of values in the sequence of values including determining one of the multiple approximate segments that, when compared to the given segment of values, yields an error less than a threshold for a largest number of values as compared to other ones of the multiple approximate segments, and wherein the signature includes a length corresponding to the largest number of values.

4. The apparatus of claim 3, wherein the instructions, when executed by the one or more processors, cause the apparatus to determine the candidate approximate segment for a given segment of values in the sequence of values further including determining one of two or more multiple approximate segments that, when compared to the given segment of values, yield an error less than a threshold for a same number of values, having a lower aggregate error when compared to the given segment of values.

5. The apparatus of claim 3, wherein the instructions, when executed by the one or more processors, cause the apparatus to perform the operand expansion further based on the candidate approximate segment associated with the length of the signature.

6. The apparatus of claim 5, wherein the instructions, when executed by the one or more processors, cause the apparatus to perform the operand expansion including maintaining a counter of a number of values generated based on the code and the key, and adding the key to the sequence of values when the counter is an initial value and completing expansion of the sequence of values when the counter equals the length.

7. A computer-implemented method for compacting segments of values for use by an artificial intelligence (AI) engine, comprising:

generating, based at least on a code and a key, multiple approximate segments of values;

comparing each segment of values in a sequence of values to the multiple approximate segments of values to determine a candidate approximate segment to replace the segment of values;

storing, in a memory and for each segment of values in the sequence of values, a signature corresponding to the candidate approximate segment determined for the segment of values, wherein the signature indicates at least the code and the key of the candidate approximate segment;

performing operand expansion to obtain, for each signature stored in the one or more memories for the sequence of values, a corresponding segment of values based on the candidate approximate segment associated with at least the code and the key indicated by the signature; and performing, by the AI engine, an AI inference computation on an operand including the corresponding segment of values obtained by the operand expansion.

8. The computer-implemented method of claim 7, further comprising segmenting the sequence of values into each segment of values using a fixed segmentation size, wherein generating the multiple approximate segments of values includes generating the multiple approximate segments of values to each be of the fixed segmentation size, and wherein determining the candidate approximate segment for a given segment of values in the sequence of values includes determining one of the multiple approximate segments that is most similar to the given segment.

9. The computer-implemented method of claim 7, further comprising segmenting the sequence of values into each segment of values using a variable segmentation size, wherein generating the multiple approximate segments of values includes generating the multiple approximate segments by setting a generation key as the key and generating each of the multiple approximate segments based on the generation key and a different code, wherein determining the candidate approximate segment for a given segment of values in the sequence of values includes determining one of the multiple approximate segments that, when compared to the given segment of values, yields an error less than a threshold for a largest number of values as compared to other ones of the multiple approximate segments, and wherein the signature includes a length corresponding to the largest number of values.

10. The computer-implemented method of claim 9, wherein determining the candidate approximate segment for a given segment of values in the sequence of values further includes determining one of two or more multiple approximate segments that, when compared to the given segment of values, yield an error less than a threshold for a same number of values, having a lower aggregate error when compared to the given segment of values.

11. The computer-implemented method of claim 9, wherein performing the operand expansion is further based on the candidate approximate segment associated with the length of the signature.

12. The computer-implemented method of claim 11, wherein performing the operand expansion includes maintaining a counter of a number of values generated based on the code and the key, and adding the key to the sequence of values when the counter is an initial value and completing expansion of the sequence of values when the counter equals the length.

13. A non-transitory computer-readable medium, comprising code executable by one or more processors for compacting segments of values for use by an artificial intelligence (AI) engine, the code comprising code for:

generating, based at least on a code and a key, multiple approximate segments of values;

comparing each segment of values in a sequence of values to the multiple approximate segments of values to determine a candidate approximate segment to replace the segment of values;

storing, in a memory and for each segment of values in the sequence of values, a signature corresponding to the candidate approximate segment determined for the segment of values, wherein the signature indicates at least the code and the key of the candidate approximate segment;

performing operand expansion to obtain, for each signature stored in the one or more memories for the sequence of values, a corresponding segment of values based on the candidate approximate segment associated with at least the code and the key indicated by the signature; and performing, by the AI engine, an AI inference computation on an operand including the corresponding segment of values obtained by the operand expansion.

14. The non-transitory computer-readable medium of claim 13, the code further comprising code for segmenting the sequence of values into each segment of values using a fixed segmentation size, wherein the code for generating the multiple approximate segments of values includes generating the multiple approximate segments of values to each be of the fixed segmentation size, and wherein the code for determining the candidate approximate segment for a given segment of values in the sequence of values determines one of the multiple approximate segments that is most similar to the given segment.

15. The non-transitory computer-readable medium of claim 13, the code further comprising code for segmenting the sequence of values into each segment of values using a variable segmentation size, wherein the code for generating the multiple approximate segments of values generates the multiple approximate segments by setting a generation key as the key and generating each of the multiple approximate segments based on the generation key and a different code, wherein the code for determining the candidate approximate segment for a given segment of values in the sequence of values determines one of the multiple approximate segments that, when compared to the given segment of values, yields an error less than a threshold for a largest number of values as compared to other ones of the multiple approximate segments, and wherein the signature includes a length corresponding to the largest number of values.

16. The non-transitory computer-readable medium of claim 15, wherein the code for determining the candidate approximate segment for a given segment of values in the sequence of values further determines one of two or more multiple approximate segments that, when compared to the given segment of values, yield an error less than a threshold for a same number of values, having a lower aggregate error when compared to the given segment of values.

17. The non-transitory computer-readable medium of claim 15, wherein the code for performing the operand expansion performs the operand expansion further based on the candidate approximate segment associated with the length of the signature.

18. The non-transitory computer-readable medium of claim 17, wherein the code for performing the operand expansion includes code for maintaining a counter of a number of values generated based on the code and the key, and adding the key to the sequence of values when the counter is an initial value and completing expansion of the sequence of values when the counter equals the length.

* * * * *